US010273944B1

(12) United States Patent
Huang et al.

(10) Patent No.: US 10,273,944 B1
(45) Date of Patent: Apr. 30, 2019

(54) PROPELLANT DISTRIBUTOR FOR A THRUSTER

(71) Applicant: The United States of America as represented by the Administrator of the National Aeronautics and Space Administration, Washington, DC (US)

(72) Inventors: Wensheng Huang, Cleveland, OH (US); John Yim, Cleveland, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 934 days.

(21) Appl. No.: 14/532,066

(22) Filed: Nov. 4, 2014

Related U.S. Application Data

(60) Provisional application No. 61/901,781, filed on Nov. 8, 2013.

(51) Int. Cl.
*F03H 1/00* (2006.01)
*B64G 1/40* (2006.01)
*H05H 1/54* (2006.01)

(52) U.S. Cl.
CPC ......... *F03H 1/0012* (2013.01); *F03H 1/0075* (2013.01); *B64G 1/405* (2013.01); *H05H 1/54* (2013.01)

(58) Field of Classification Search
CPC .... F03H 1/0012; F03H 1/0037; F03H 1/0062; F03H 1/0068; F03H 1/0075; H05H 1/54; B64G 1/405
See application file for complete search history.

(56) References Cited

U.S. PATENT DOCUMENTS

| | | | |
|---|---|---|---|
| 3,576,107 A | 4/1971 | Nakanishi | |
| 3,585,441 A | 6/1971 | LaRocca | |
| 3,604,209 A | 9/1971 | King et al. | |
| 3,757,518 A | 9/1973 | Bahr | |
| 4,862,032 A | 8/1989 | Kaufman et al. | |
| 5,218,271 A * | 6/1993 | Egorov | H01J 27/143 313/231.31 |
| 5,475,354 A * | 12/1995 | Valentian | F03H 1/0075 313/359.1 |
| 5,581,155 A * | 12/1996 | Morozov | F03H 1/0075 313/231.31 |
| 5,646,476 A | 7/1997 | Aston | |
| 5,763,989 A * | 6/1998 | Kaufman | H01J 27/143 313/361.1 |
| 5,945,781 A | 8/1999 | Valentian | |
| 6,281,622 B1 | 8/2001 | Valentian et al. | |
| 6,612,105 B1 | 9/2003 | Voigt et al. | |
| 6,750,600 B2 * | 6/2004 | Kaufman | H01J 27/146 313/231.01 |
| 6,960,888 B1 | 11/2005 | Foster | |
| 7,116,054 B2 * | 10/2006 | Zhurin | H01J 27/143 250/427 |

(Continued)

*Primary Examiner* — Lorne E Meade
(74) *Attorney, Agent, or Firm* — Robert H. Earp, III; William M. Johnson (57) ABSTRACT

A propellant distributor or anode includes a plenum chamber and a plurality of outlets. The at least one plenum chamber is configured to receive a flow of propellant from an inlet, and the plurality of outlets are configured to distribute the flow of propellant into an inner channel wall and an outer channel wall of a discharge channel.

11 Claims, 9 Drawing Sheets

(56) References Cited

U.S. PATENT DOCUMENTS

| | | |
|---|---|---|
| 7,506,497 B2 | 3/2009 | Roy |
| 7,621,115 B2 | 11/2009 | Furukawa |
| 7,791,260 B2 | 9/2010 | Gallimore et al. |
| 8,468,794 B1 | 6/2013 | Patterson |
| 8,704,444 B2 * | 4/2014 | Marchandise ........ F03H 1/0012 |
| | | 315/111.21 |
| 2002/0116915 A1 | 8/2002 | Hruby et al. |
| 2008/0272307 A1 * | 11/2008 | Helsby .................... G01T 1/185 |
| | | 250/389 |
| 2012/0311992 A1 | 12/2012 | Ozaki et al. |

* cited by examiner

PROPELLANT DISTRIBUTOR FOR A THRUSTER

CROSS REFERENCE TO RELATED APPLICATION

This application is a non-provisional of, and claims priority to, U.S. Provisional Patent Application Ser. No. 61/901,781, which was filed Nov. 8, 2013. The subject matter of this earlier-filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention generally pertains to a propellant distributor (or anode), and in particular, to a propellant distributor with a downstream plenum chamber for a Hall thruster.

BACKGROUND

Traditionally, Hall thruster propellant distributors include a plenum chamber located upstream in the thruster, and a distributor (or orifices) located downstream in the thruster. In the conventional design, the orifices are closer to a plasma region (or an ionization zone) increasing the potential for the orifices to be clogged or damaged by external debris.

Furthermore, conventional Hall thruster propellant distributors have additional disadvantages. For example, propellant flow entering the ionization zone is generally not sufficiently uniform as measured by neutral flux density. Moreover, the assembly process for conventional Hall thruster propellant distributors is generally complex and requires several parts.

Thus, an alternative approach may be beneficial.

SUMMARY

Certain embodiments of the present invention may be implemented and provide solutions to the problems and needs in the art that have not yet been fully solved by conventional hall thruster propellant distributors. For example, some embodiments pertain to a propellant distributor. The propellant distributor may receive neutral propellant through at least one inlet, and distribute the propellant to an ionization zone of a thruster in an azimuthally uniform and radially balanced flow.

In one embodiment, an apparatus includes a plurality of outlets located upstream in the thruster discharge channel. The plurality of outlets are configured to distribute a flow of propellant to an ionization zone of a thruster discharge channel.

In another embodiment, an apparatus includes at least one plenum chamber configured to receive a flow of propellant from an inlet. The apparatus also includes a plurality of outlets configured to distribute the flow of propellant into an inner channel wall and an outer channel wall of a discharge channel. The at least one plenum chamber is downstream from the plurality of outlets in the discharge channel.

In yet another embodiment, an apparatus includes at least one plenum chamber configured to receive a flow of propellant from an inlet. The apparatus also includes a plurality of outlets configured to distribute the flow of propellant into an inner channel wall and an outer channel wall of a discharge channel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Conventional propellant distributors use one or two upstream plenum chambers with small orifices. The upstream plenum chambers promote choked flow to achieve azimuthal propellant uniformity. Embodiments of the present invention, however, generally discuss the use of a propellant distributor that includes at least one plenum chamber and outlet orifices (or outlets). In one embodiment, the outlets are located upstream in a thruster discharge chamber (or discharge channel), while the at least one plenum chamber is located downstream in the discharge channel. In another embodiment, the at least one plenum chamber and the outlets (or splitter section(s)) are at the same axial position.

The embodiments discussed herein allow certain advantages to be simultaneously realized. First, unlike conventional propellant distributors, the propellant mixing path is increased since propellant has to travel an additional, narrow path exterior to the propellant distributor to reach the main volume of the discharge channel. Second, the outlets of the propellant distributor are shielded from debris and plasma by the structure of the downstream plenum chamber. Since the plenum chamber is located downstream, neutral flow exits into the discharge channel along discharge channel walls.

Figure 1:
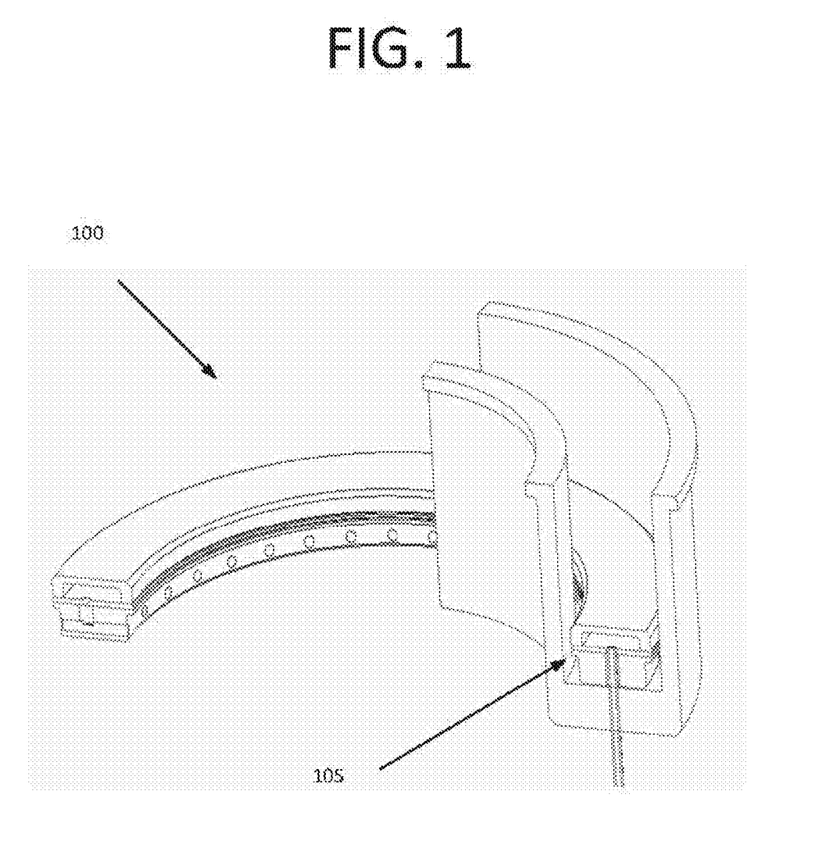
FIG. 1 shows a hall thruster assembly including a propellant distributor, according to an embodiment of the present invention.

FIG. 1 shows a hall thruster assembly 100, according to an embodiment of the present invention. Hall thruster assembly 100 includes a radially uniform propellant distributor 105 located upstream, while an ionization zone (not shown) of hall thruster 100 is located downstream.

Figure 2:
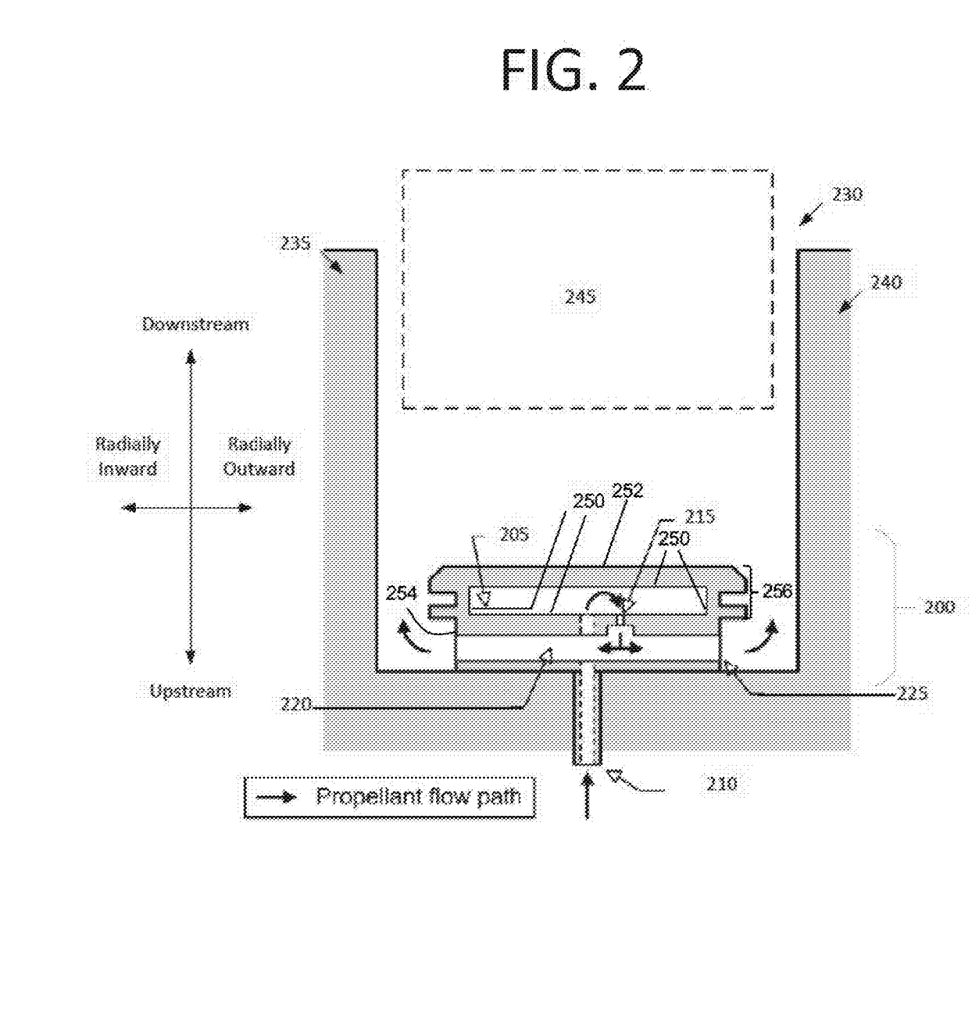
FIG. 2 shows a propellant distributor, according to an embodiment of the present invention.

FIG. 2 shows a propellant distributor 200, according to an embodiment of the present invention. In this embodiment, propellant distributor 200 is located upstream and a plasma region (or ionization zone) 245 is located downstream in discharge channel 230. In this embodiment, propellant distributor 200 receives propellant from a single inlet 210. In other embodiments, propellant distributor 200 may receive propellant from one or more inlets.

Propellant distributor 200 also includes a plenum chamber 205. Plenum chamber 205 may receive propellant from inlet 210. While this embodiment includes a single plenum chamber 205, other embodiments may include more than one plenum chamber. As shown in FIG. 2, plenum chamber 205 is located downstream relative to outlets 225, causing the propellant to travel through an additional, narrow path exterior to propellant distributor 200 to reach discharge channel 230. The increase in the mixing length for the propellant (or gas) improves the azimuthal flow uniformity. Stated differently, in propellant distributor 200, the increased mixing length, i.e., diffusion length, increases the time for the gas to diffuse before reaching the ionization zone improving flow uniformity.

The downstream placement of plenum chamber 205 allows for even distribution of propellant flow. For example, the downstream placement of plenum chamber 205 allows neutral propellant flow to exit into discharge channel 230 along discharge walls, i.e., inner channel wall 235 and outer channel wall 240.

Furthermore, by placing plenum chamber 205 downstream, outlets 225 are placed upstream. This protects outlets 225 from debris originating from discharge channel walls 235, 240 or from regions outside of discharge channel 230. As shown, propellant distributor 200 also includes a plurality of inner surfaces 250 that define the plenum chamber 205. Propellant distributor 200 also includes sidewalls 254 and a downstream portion 256. The downstream portion 256 includes a downstream external surface 252 possessing chamfered edges. In this embodiment, the downstream portion 256 has overhanging sections extending outward to protect outlets 225 from debris. The downstream edges of plenum chamber 205 are chamfered to prevent electric field concentration.

Post-plenum orifice 215 connects plenum chamber 205 and splitter section 220, and guides propellant flow from plenum chamber 205 and into splitter section 220. In this embodiment, post-plenum orifice 215 is offset from the radial center of plenum chamber 205. This offset balances the neutral propellant flow along inner channel wall 235 and outer channel wall 240 of discharge channel 230. In other words, the offset of post-plenum orifice allows the flow of propellant radially inward versus radially outward to be balanced through splitter section 220. As a result, the ratio of the propellant flux travelling radially inward to the propellant flux travelling radially outward may be controlled. This control may be used to achieve radially balanced propellant flux. Stated differently, the offset allows the flow balance to be controlled, which may be used to achieve near perfect balance and/or create a specific ratio of flow.

Figure 3:
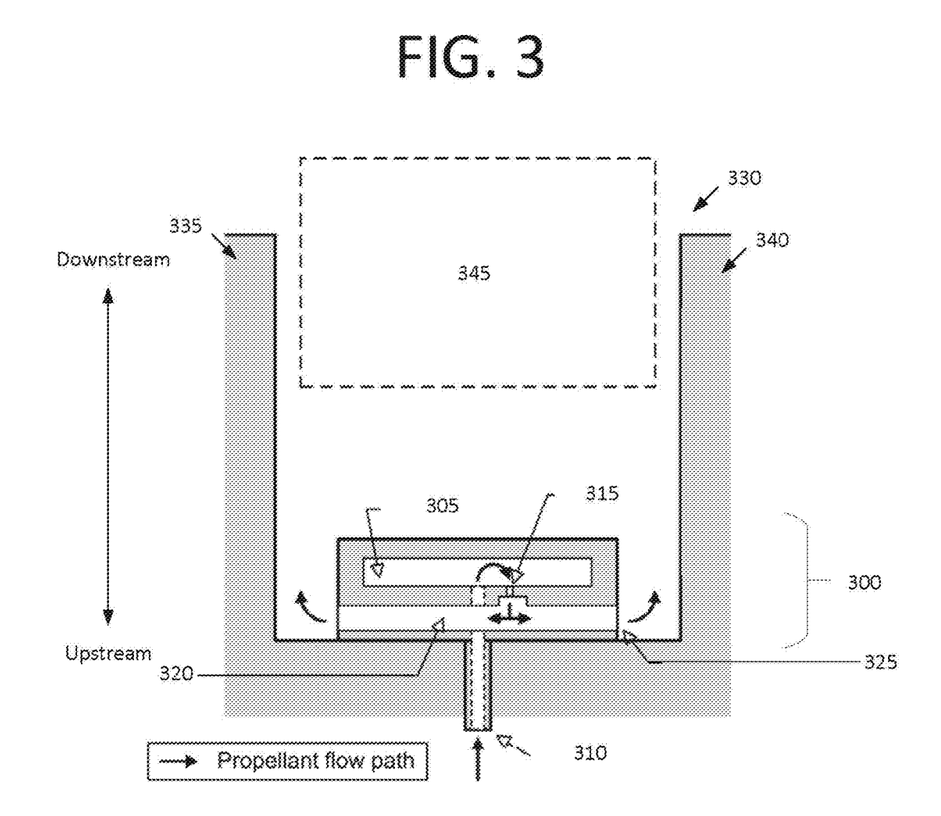
FIG. 3 shows a propellant distributor, according to an embodiment of the present invention.

FIG. 3 shows a propellant distributor 300, according to an embodiment of the present invention. Similar to propellant distributor 200 of FIG. 2, propellant distributor 300 of FIG. 3 is located upstream and plasma region 345 is located downstream in discharge channel 330. Propellant distributor 300 includes a plenum chamber 305, an inlet 310, post-plenum orifice 315, splitter section 320, and outlets 325. In this embodiment, sides of plenum chamber 305, which face inner channel wall 235 and outer channel wall 240 of discharge channel 330, are flushed with splitter section 320. Simply put, the walls of plenum chambers 305 do not include overhanging sections. The flush sides of plenum chamber 305 allow propellant distributor 300 to be easily manufactured.

Figure 4:
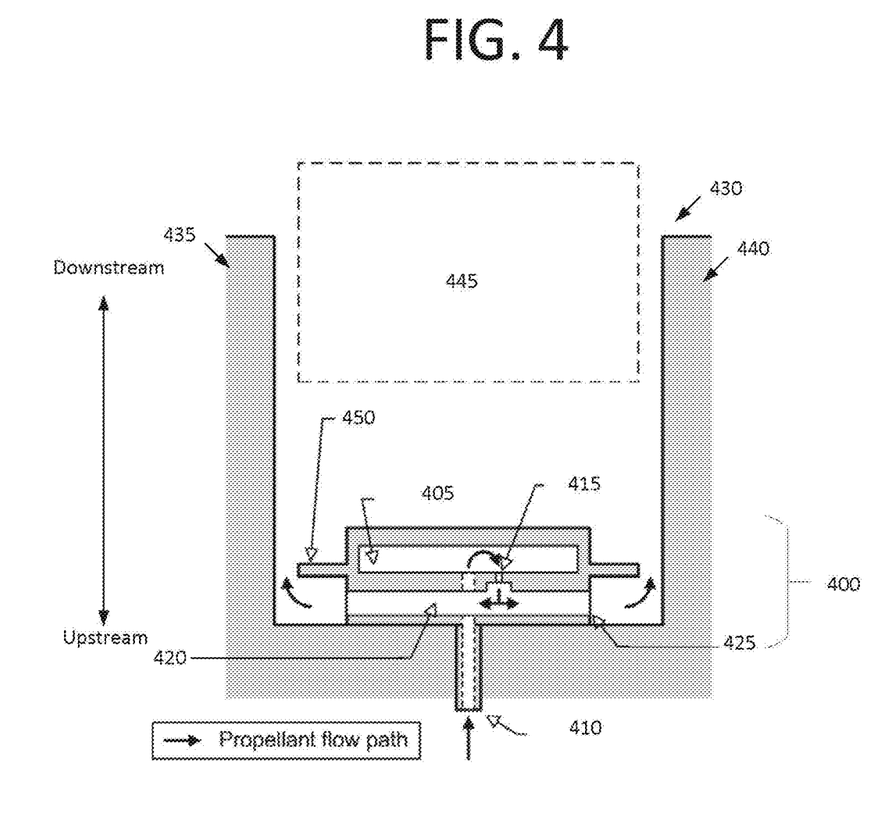
FIG. 4 shows a propellant distributor, according to an embodiment of the present invention.

FIG. 4 shows a propellant distributor 400, according to an embodiment of the present invention. Similar to propellant distributor 200 of FIG. 2, propellant distributor 400 of FIG. 4 is located upstream and plasma region 445 is located downstream in discharge channel 430. Propellant distributor 400 includes a plenum chamber 405, an inlet 410, post-plenum orifice 415, splitter section 420, and outlets 425. In this embodiment, the sides of plenum chamber 410, which face inner channel wall 435 and outer channel wall 440 of discharge channel 430, include an extra overhanging section 450. Overhanging section 450 provides extra protection to outlets 425 from debris.

Extra overhanging section 450 improves uniformity by increasing collisional frequency for the propellant. It should be appreciated that the uniformity of the propellant prior to reaching the plasma region is dependent on collisional frequency and diffusion path. In this embodiment, the narrower cross section created by extra overhanging section 450 increases collisional frequency, which improves uniformity. This may also create a longer diffusion path increasing the amount of time the propellant spends diffusing (or mixing), improving uniformity.

Figure 5:
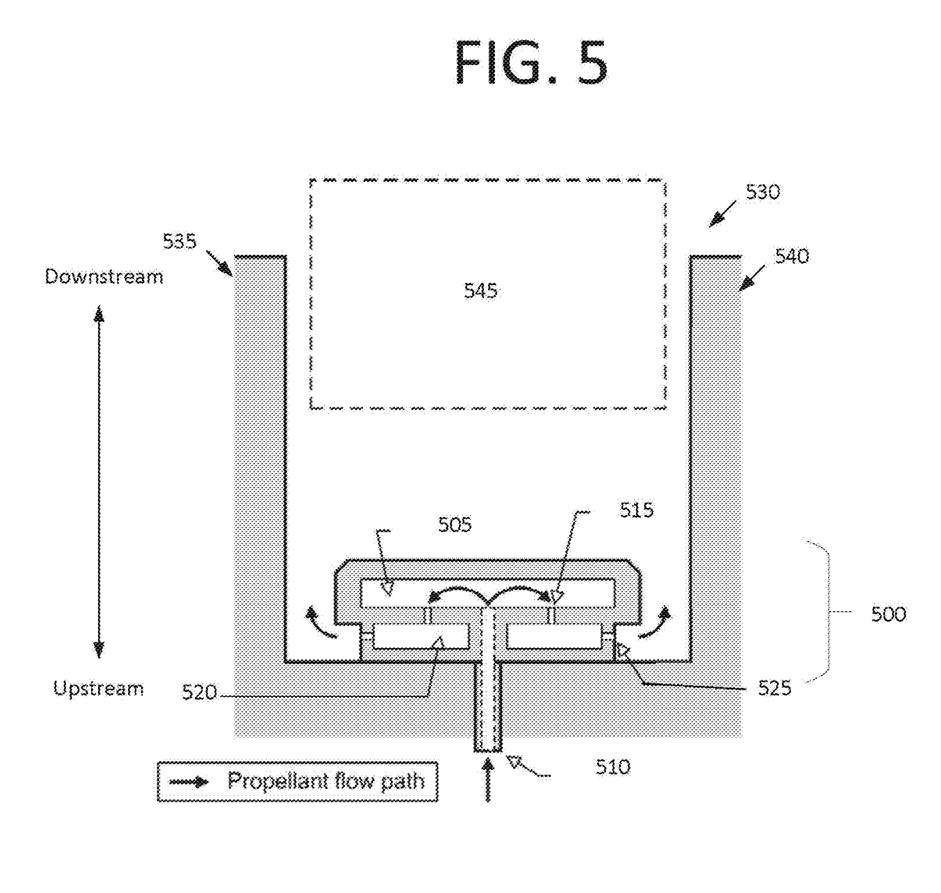
FIG. 5 shows a propellant distributor, according to an embodiment of the present invention.

FIG. 5 shows a propellant distributor 500, according to an embodiment of the present invention. Similar to propellant distributor 200 of FIG. 2, propellant distributor 500 of FIG. 5 is located upstream and plasma region 545 is located downstream in discharge channel 530. Propellant distributor 500 includes a plenum chamber 505 and an inlet 510. In this embodiment, however, propellant distributor 500 includes two post-plenum orifices 515 equally distributing propellant flow into splitter sections 520. The additional splitter section in this embodiment provides an additional azimuthal mixing region to improve azimuthal flow uniformity.

This may also allow the balance of the propellant flow to exit toward inner channel wall 535 of discharge channel 530 instead of outer channel wall 540 of discharge channel 530 through outlets 525. This may be achieved by using different number and sizes of holes for post-plenum orifices 515

This embodiment may be an alternative to flow balancing providing better control, and may be easier to manufacture for certain sizes of propellant distributors 500. It should be appreciated that the manufacturing process for this embodiment may be different from the other embodiments described herein. It should also be appreciated that the various embodiments described herein may have a different manufacturing process.

Figure 6:
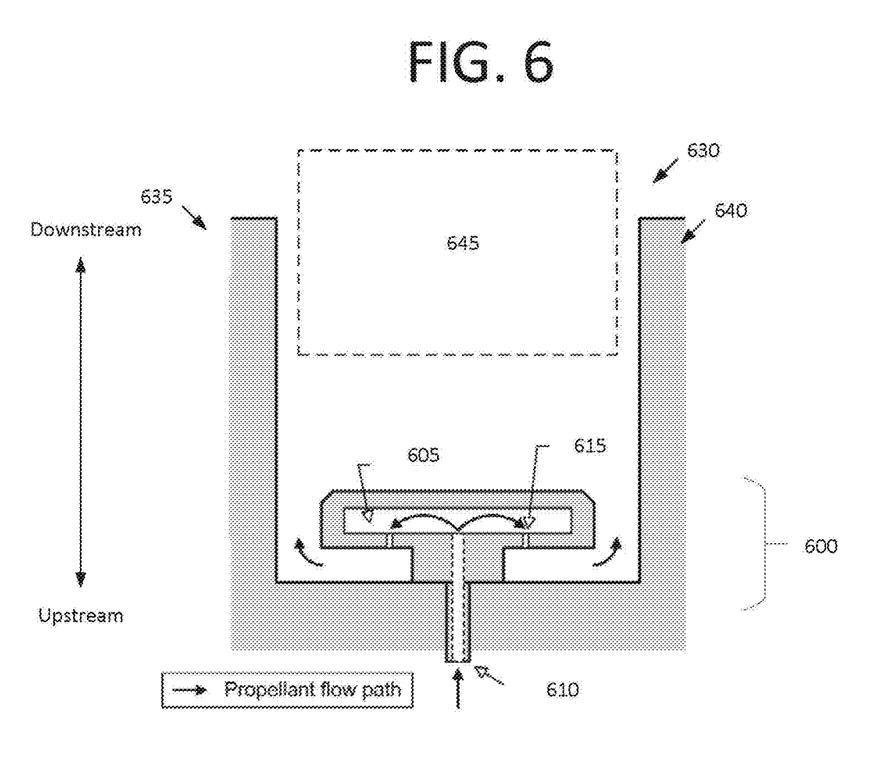
FIG. 6 shows a propellant distributor, according to an embodiment of the present invention.

FIG. 6 shows a propellant distributor 600, according to an embodiment of the present invention. Similar to propellant distributor 200 of FIG. 2, propellant distributor 600 of FIG. 6 is located upstream and plasma region 645 is located downstream in discharge channel 630. Propellant distributor 600 includes a plenum chamber 605, an inlet 610, and post-plenum orifices 615. In this embodiment, however, the splitter section of FIG. 2 is replaced with a set of post-plenum orifices 615 that exits directly towards inner channel wall 635 and outer channel wall 640 of discharge channel 630. In some embodiments, the balance of the propellant flow may move towards inner channel wall 635 versus outer channel wall 640 by using different number and sizes of holes for post-plenum orifices 615. This embodiment may be manufactured with ease depending on the dimensions of propellant distributor 600 and the available manufacturing processes.

Figure 7:
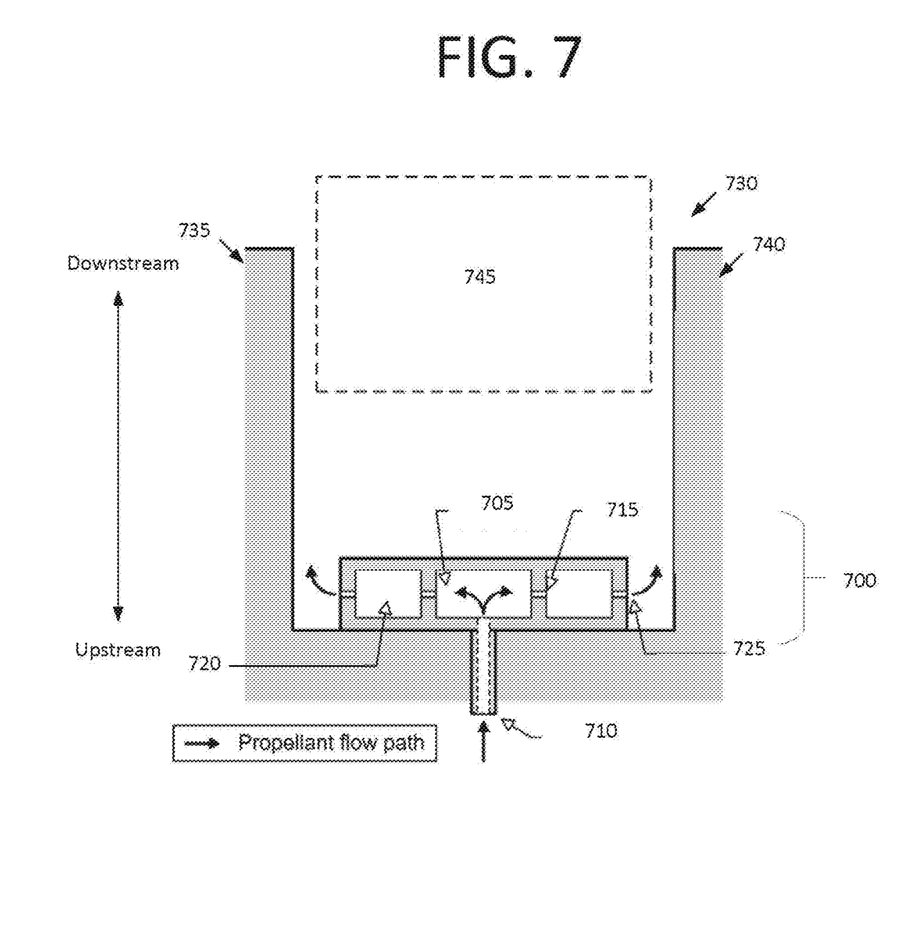
FIG. 7 shows a propellant distributor, according to an embodiment of the present invention.

FIG. 7 shows a propellant distributor 700, according to an embodiment of the present invention. Similar to propellant distributor 200 of FIG. 2, propellant distributor 700 of FIG. 7 is located upstream and plasma region 745 is located downstream in discharge channel 730. Propellant distributor 700 includes a plenum chamber 705, an inlet 710, post-plenum orifices 715, and splitter sections 720, and outlets 725. In this embodiment, plenum chamber 705 is placed at the same axial location as splitter sections 720 to decrease the axial length of overall distributor 700. The placement of plenum chamber 705 in this embodiment reduces axial length of propellant distributor 700 if constrained in the axial direction.

Figure 8:
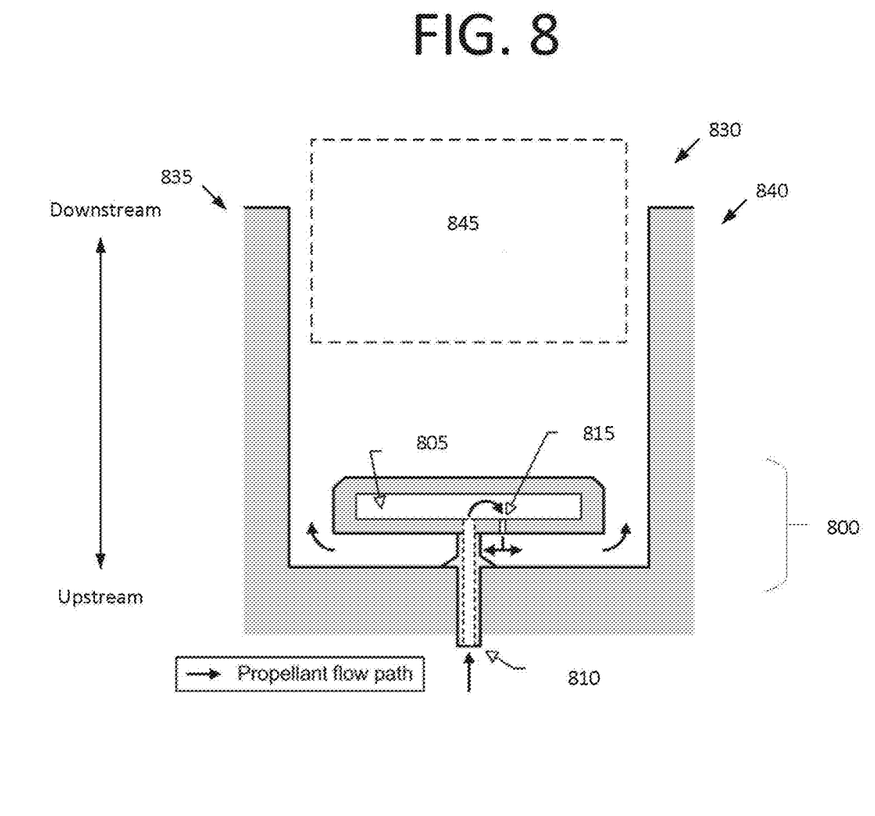
FIG. 8 shows a propellant distributor, according to an embodiment of the present invention.

FIG. 8 shows a propellant distributor 800, according to an embodiment of the present invention. Similar to propellant distributor 200 of FIG. 2, propellant distributor 800 of FIG. 8 is located upstream and plasma region 845 is located downstream in discharge channel 830. Propellant distributor 800 includes a plenum chamber 805, an inlet 810, and post-plenum orifice 815.

In this embodiment, however, splitter section 220 of FIG. 2 is removed to create an open space between the upstream surface of plenum chamber 805 and inner channel wall 835 and outer channel wall 840 of discharge channel 830. The open space may promote better propellant flow mixing. For instance, this embodiment may decrease the distance between the upstream face of propellant distributor 800 and discharge channel 830 to increase collision frequency while creating a longer mixing path through the use of the open space. Also, the balance of the propellant flow going towards inner channel wall 835 versus outer channel wall 840 may be achieved by setting the radial position of the post-plenum orifices 815

Figure 9:
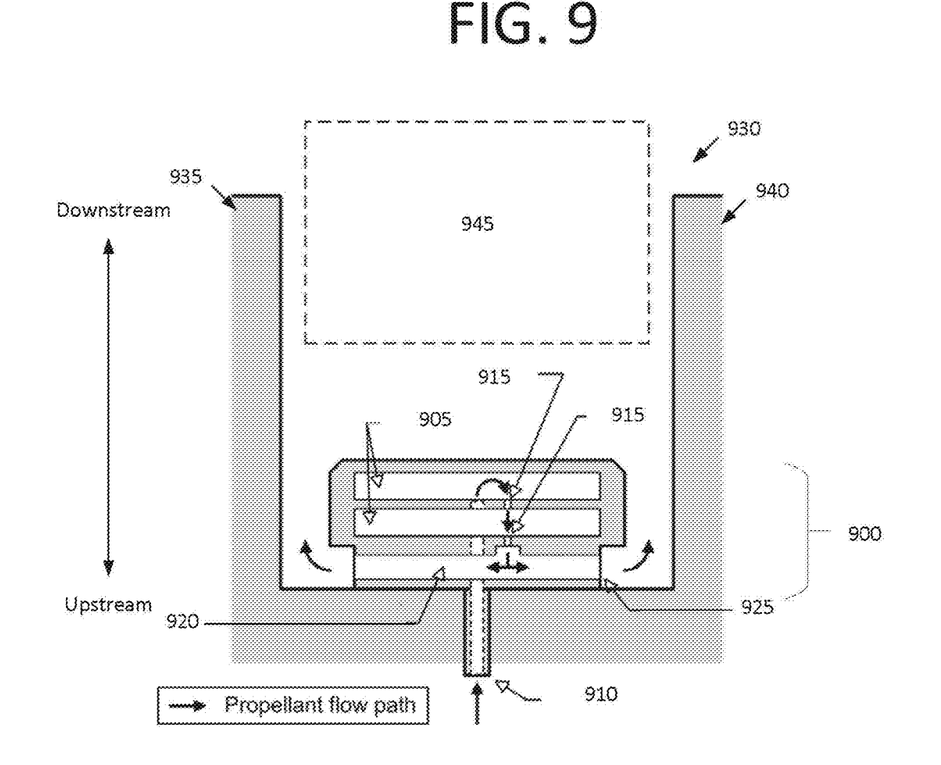
FIG. 9 shows a propellant distributor, according to an embodiment of the present invention.

FIG. 9 shows a propellant distributor 900, according to an embodiment of the present invention. Similar to propellant distributor 200 of FIG. 2, propellant distributor 900 of FIG. 9 is located upstream and plasma region 945 is located downstream in discharge channel 930. In this embodiment, propellant distributor 900 includes two plenum chambers 905, an inlet 910, two post-plenum orifices 915, and a splitter section 920, and outlets 925. Plenum chambers 905 and sets of post-plenum orifices 915 improve the azimuthal uniformity of the distribution of propellant prior to the propellant exiting plenum chambers 905.

Also, in this embodiment, for a given level of uniformity, the increased number of plenum chambers 905 allows post-plenum orifices 915 to be larger in size. This makes it easier to manufacture propellant distributor 900. It should be appreciated that FIG. 9 shows two plenum chambers 905. However, a person of ordinary skill in the art would appreciate that additional plenum chambers 905 may be used, thereby increasing the number of post-plenum orifices 915.

One or more embodiments described herein pertains to a propellant distributor configured to uniformly inject propellant in both the azimuthal and radial direction for the lifetime of the Hall thruster. Because the flux density of the neutral flow may be azimuthally uniform and radially balanced, localized hot spots are prevented from forming on the channel walls or the propellant distributor. In one embodiment, the propellant distributor is configured to distribute neutral propellant into an annular discharge channel. In certain embodiments, the propellant distributor may be used as an anode.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
   a thruster discharge channel in fluid communication with a propellant inlet, the propellant inlet configured to receive a flow of propellant; and
   a propellant distributor disposed within the thruster discharge channel, the propellant distributor comprising:

a plurality of inner surfaces defining a plenum chamber such that the entirety of the plenum chamber is contained within the propellant distributor and downstream from the propellant inlet;

a splitter section disposed completely upstream of the plenum chamber, wherein the splitter section is separate from the plenum chamber, wherein the flow of propellant enters the plenum chamber via the propellant inlet, wherein the plenum chamber includes a post-plenum orifice extending to the splitter section such that at least some of the flow of propellant exits the plenum chamber and enters the splitter section via the post-plenum orifice, wherein the splitter section is configured to divide the flow of propellant into separate flows traveling in different directions within the thruster discharge channel; and a plurality of outlets extending from the splitter section, wherein each one of the plurality of outlets are located upstream of entireties of the plurality of inner surfaces defining the plenum chamber and downstream of the propellant inlet, wherein each one of the plurality of outlets are configured to distribute the flow of propellant to a plasma of the thruster discharge channel.

2. The apparatus of claim 1, wherein the propellant distributor is configured to shield the plurality of outlets from debris or plasma.

3. The apparatus of claim 1, wherein the propellant distributor is configured to evenly distribute the flow of propellant into the thruster discharge channel.

4. The apparatus of claim 1, wherein the propellant distributor comprises a downstream external surface having chamfered edges configured to prevent electric field concentration.

5. The apparatus of claim 1, wherein the post-plenum orifice is offset from a radial center of the plenum chamber to balance the flow of propellant between a first flow towards an inner channel wall of the thruster discharge channel and a second flow towards an outer channel wall of the thruster discharge channel.

6. The apparatus of claim 5, wherein the splitter section is configured to discharge the first and second flows through the plurality of outlets.

7. The apparatus of claim 1, wherein entireties of each one of the plurality of outlets are located upstream of the plurality of inner surfaces.

8. The apparatus of claim 1, wherein the post-plenum orifice includes a first section extending from the first one of the plurality of inner surfaces and a second section extending between the first section and the splitter section, wherein the second section has a greater cross-sectional area than the first section.

9. The apparatus of claim 1, wherein the propellant distributor comprises sidewalls and a downstream portion, the downstream portion having a downstream external surface facing an ionization region contained in the thruster discharge channel, wherein each of the plurality of outlets are located on the sidewalls and extend substantially perpendicular to the propellant inlet.

10. The apparatus of claim 9, wherein the propellant distributor comprises a first overhanging section disposed downstream of the plurality of outlets, the first overhanging section extending from the downstream portion.

11. The apparatus of claim 10, wherein the propellant distributor comprises a second overhanging section disposed upstream of the first overhanging section and downstream of the plurality of outlets.

\* \* \* \* \*